United States Patent
Cibelli

(10) Patent No.: US 12,155,616 B2
(45) Date of Patent: Nov. 26, 2024

(54) SYSTEMS AND METHODS FOR DETERMINING SCORES FOR MESSAGES BASED ON ACTIONS OF MESSAGE RECIPIENTS AND A NETWORK GRAPH

(71) Applicant: Microsoft Technology Licensing, LLC, Redmond, WA (US)

(72) Inventor: Maurizio Cibelli, Mercato San Severino (IT)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 18/392,642

(22) Filed: Dec. 21, 2023

(65) Prior Publication Data

US 2024/0129268 A1 Apr. 18, 2024

Related U.S. Application Data

(62) Division of application No. 17/828,901, filed on May 31, 2022, now Pat. No. 11,895,074.

(51) Int. Cl.
*H04L 51/226* (2022.01)
*H04L 51/212* (2022.01)
*H04L 51/216* (2022.01)
*H04L 51/224* (2022.01)
*H04L 51/42* (2022.01)

(52) U.S. Cl.
CPC .......... *H04L 51/226* (2022.05); *H04L 51/212* (2022.05); *H04L 51/216* (2022.05); *H04L 51/224* (2022.05); *H04L 51/42* (2022.05)

(58) Field of Classification Search
CPC ..... H04L 51/226; H04L 51/42; H04L 51/216; H04L 51/224; H04L 51/212
USPC .......................................... 709/226
See application file for complete search history.

(56) References Cited

U.S. PATENT DOCUMENTS

| | | | |
|---|---|---|---|
| 6,421,709 B1* | 7/2002 | McCormick | H04L 51/212 709/206 |
| 6,772,196 B1* | 8/2004 | Kirsch | H04L 51/212 707/999.005 |
| 10,886,891 B2* | 1/2021 | Kuroyanagi | H03H 9/6483 |
| 2004/0255122 A1* | 12/2004 | Ingerman | G06Q 10/107 713/176 |
| 2005/0097319 A1* | 5/2005 | Zhu | G06Q 10/00 713/166 |
| 2019/0121866 A1* | 4/2019 | Garg | H04L 51/52 |
| 2019/0138653 A1* | 5/2019 | Roller | G06F 40/35 |
| 2021/0142004 A1* | 5/2021 | Li | G06F 40/253 |

* cited by examiner

*Primary Examiner* — Sargon N Nano
(74) *Attorney, Agent, or Firm* — RAY QUINNEY & NEBEKER P.C.; Adam K. Richards

(57) ABSTRACT

Methods and systems cause display of email messages of a user on a screen of a computing system based on scores associated with the email messages. An email ranking system may have assigned the scores to the email messages. The scores are based on actions that other recipients of the email messages have taken with respect to the email messages. In calculating the scores, the actions of the other recipients may receive different weights based on how closely connected a recipient is to the user and a type of connection the recipient has to the user. A network graph may indicate how closely connected the recipient is to the user and the type of connection the recipient has to the user.

20 Claims, 8 Drawing Sheets

SYSTEMS AND METHODS FOR DETERMINING SCORES FOR MESSAGES BASED ON ACTIONS OF MESSAGE RECIPIENTS AND A NETWORK GRAPH

CROSS-REFERENCE TO RELATED APPLICATIONS

This application is a divisional of U.S. patent application Ser. No. 17/828,901, filed May 31, 2022, which is hereby incorporated by reference in its entirety.

BACKGROUND

Individuals use computing devices (such as mobile phones and personal computers) to perform a variety of different tasks. For example, individuals can use computing devices to communicate with each other using voice calls, video conferencing, electronic messaging systems (e.g., email, texting, and instant messaging systems), social networking systems, and collaboration systems. Email systems may allow individuals to compose, send, receive, view, and organize email messages.

An email system may include an email service. The email service may store copies of email messages. A user may be able to access the email service and view email messages using a web browser. The user may also be able to access the email service and view email messages using an email application stored on a computing device. The email application may store local copies of the email messages that are stored on the email service. The user may send email messages to and receive email messages from coworkers.

BRIEF SUMMARY

In some embodiments, a method is disclosed. The method includes causing display of messages on a screen of a computing system based on timestamps of the messages. The timestamps indicate times at which a messaging account received the messages. The method also includes receiving, from a user, a request to cause display of the messages based on scores associated with the messages. The scores are based on one or more actions of recipients of the messages with respect to the messages and on distances between the user and the recipients as indicated by a network graph. The method further includes causing display of a list of previews of the messages on the screen of the computing system. An order of the previews within the list is based on the scores associated with the messages.

Causing the display of the list of the previews of the messages on the screen of the computing system may include causing the display of the previews in descending order in the list based on the scores associated with the messages.

The network graph may include nodes representing the user and the recipients and links representing connections between the user and the recipients.

The distances may represent a measure of closeness of connection between the user and each recipient of the recipients.

The scores may be further based on weighting factors placed on the one or more actions. The weighting factors may be based on the distances.

The network graph may indicate types of connections between the user and one or more recipients of the recipients. The scores may be further based on the types of connection between the user and the recipients of the messages.

In other embodiments, a computer-readable medium is disclosed. The computer-readable medium includes instructions that are executable by one or more processors to cause a computing system to cause display of messages on a screen of the computing system based on timestamps of the messages. The timestamps indicate times at which an email account received the messages. The computer-readable medium further includes instructions that are executable by the one or more processors to cause the computing system to receive, from a user, a request to cause display of the messages based on scores associated with the messages. The scores are based on one or more actions of recipients of the messages with respect to the messages and on distances between the user and the recipients as indicated by a network graph. The computer-readable medium further includes instructions that are executable by the one or more processors to cause the display of a list of previews of the messages on the screen of the computing system. An order of the previews within the list is based on the scores associated with the messages.

Causing display of the list of the previews of the messages on the screen of the computing system may include causing display of the previews in descending order in the list based on the scores associated with the messages.

The network graph may include nodes representing the user and the recipients and links representing connections between the user and the recipients.

The scores may be further based on weighting factors placed on the one or more actions. The weighting factors may be based on the distances. The messages may include a first message and the recipients may include a first recipient. A first score may be associated with the first message and the one or more actions may include a first action by the first recipient with respect to the first message. The network graph may indicate a first distance between the user and the first recipient. The first score may be based on a first weighting factor placed on the first action. The first weighting factor may be based on the first distance. The recipients may include a second recipient. The one or more actions may include a second action by the second recipient with respect to the first message. The network graph may indicate a second distance between the user and the second recipient. The second distance may be larger than the first distance. The first score may be based on a second weighting factor placed on the second action. The second weighting factor may be based on the second distance. The second action may receive less weight than the first action.

The network graph may indicate a type of hierarchical connection between the user and the recipients of the messages. The scores may be further based on the type of hierarchical connection between the user and the recipients of the messages. The messages may include a first message and the recipients may include a first recipient. A first score may be associated with the first message, and the one or more actions may include a first action by the first recipient with respect to the first message. The network graph may indicate a first type of hierarchical connection between the user and the first recipient. The first score may be based on a first weighting factor placed on the first action. The first weighting factor may be based on the first type of hierarchical connection. The recipients may include a second recipient. The one or more actions may include a second action by the second recipient with respect to the first message. The network graph may indicate a second type of hierarchical connection between the user and the second recipient. The second type of hierarchical connection may be different from than the first type of hierarchical connection. The first score may be based on a second weighting factor placed on the second action. The second weighting factor may be based on the second type of hierarchical connection. The second action may receive less weight than the first action.

In yet other embodiments, a system is disclosed. The system includes one or more processors. Also, the system includes memory in electronic communication with the one or more processors. The system includes instructions stored in the memory. The instructions are executable by the one or more processors to cause display of messages on a screen of the system based on timestamps of the messages. The timestamps indicate times at which a messaging account received the messages. The instructions are executable by the one or more processors to receive, from a user, a request to cause display of the messages based on scores associated with the messages. The scores are based on one or more actions of recipients of the messages with respect to the messages and on distances between the user and the recipients as indicated by a network graph. The instructions are executable by the one or more processors to cause display of a list of previews of the messages on the screen of the system. An order of the previews within the list is based on the scores associated with the messages.

Causing the display of the list of the previews of the messages on the screen of the system may include causing the display of the previews in descending order in the list based on the scores associated with the messages.

The scores may be further based on weighting factors placed on the one or more actions. The weighting factors may be based on the distances.

The network graph may include nodes representing the user and the recipients and links representing connections between the user and the recipients.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail using the accompanying drawings in which.

DETAILED DESCRIPTION

Figure 1:
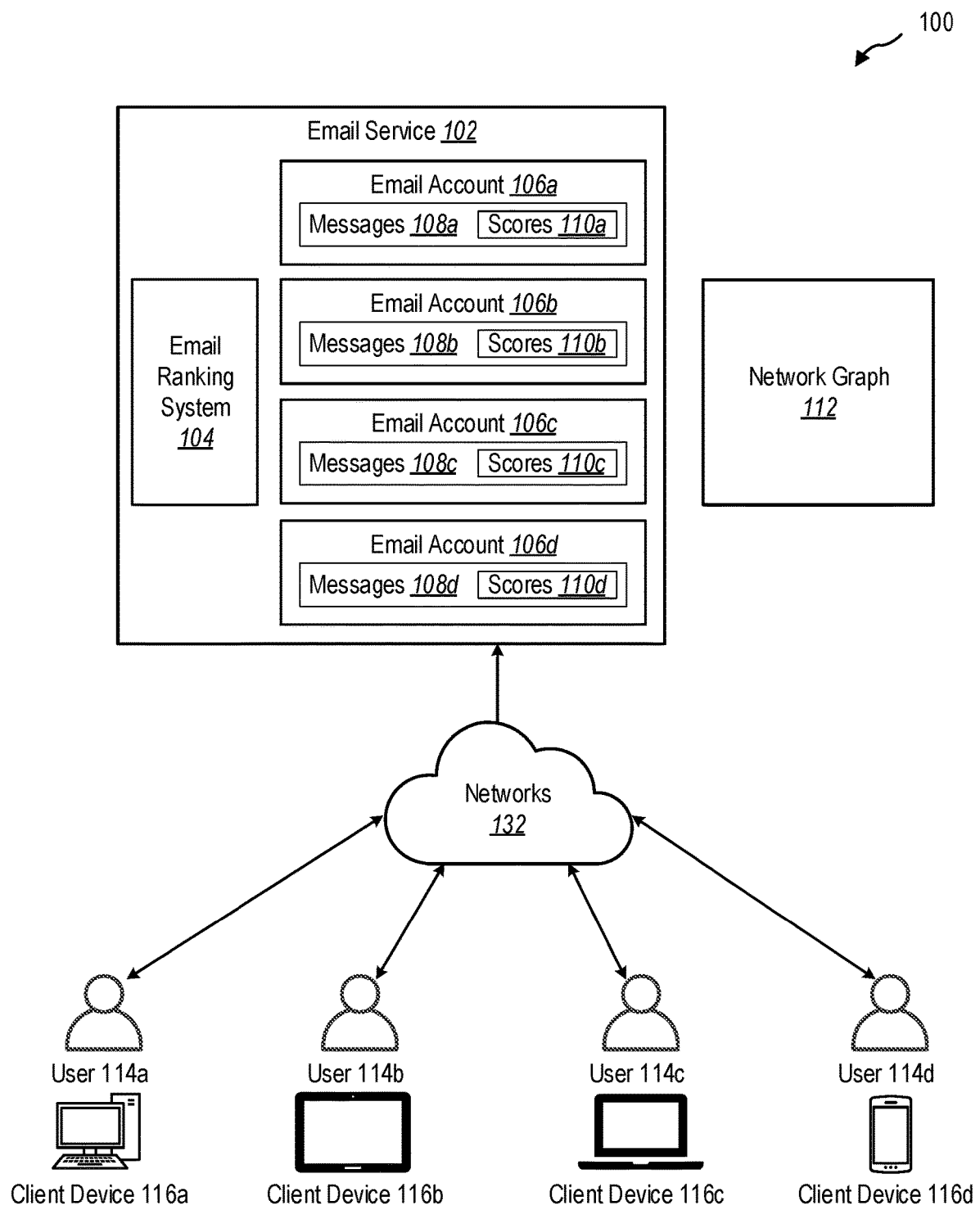
FIG. 1 illustrates an example email system that includes an email service accessed by users. The email service includes an email ranking system that determines scores for email messages contained in the email service.

This disclosure relates to systems and methods for improving the usefulness of an email service. The improvement to the email service allows users of the email service to identify important emails more quickly and easily, particularly in situations in which the users receive more emails than the users can timely review. An email ranking system assigns scores to emails of a user based on the actions that other recipients of the emails have taken with respect to the emails. The emails may be stored in an email service. In determining the scores, the email ranking system may also weight a recipient's action based on how closely connected the recipient is to the user and a type of connection the recipient has to the user. Each email's score may represent a likelihood that the email contains content that is important to the user. A client device may allow the user to view the user's emails. The client device may display the user's emails based on the scores. For example, the client device may list the emails in descending order based on the scores, enabling the user to prioritize review of emails that are more likely to be important to the user. Thus, the user can make better use of the email service and the client device because the user can easily identify and review important emails rather than having to review numerous trivial emails to identify the important emails.

Email is an integral part of business and personal communication. An email system may include an email service that client devices (such as smartphones, tablets, laptops, and desktops) access through a network, such as the internet. The client devices may access the email service using a locally stored email application or through a web interface using an internet browser.

The email service may be a collection of hardware and software that manages email messages associated with a plurality of email accounts. (For convenience, this disclosure may use the term "message(s)" to refer to "email message(s)." The concepts of this disclosure are, however, equally applicable to messages other than email messages. An email message is just one example of a message.) Each email account may be associated with one or more email addresses and may require authentication information (such as a password) to access. A user may access email messages associated with an email account using one or more client devices.

The email messages associated with each email account may be organized into folders. For example, each email account may include an "Inbox" folder that contains copies of messages sent to the account and a "Sent Mail" folder that contains copies of messages sent from the account. When the email service receives an email message sent to the account, the email service may store a copy of that email message in the "Inbox" associated with the account. And when the email service receives an email message sent from the account to an email recipient, the email service may store a copy of the email message in the "Sent Mail" folder associated with the account and then send the email message to the email recipient. In some designs, a single folder may hold all email associated with an email account.

Each email may have a sender and one or more recipients. Recipients may be included on a TO line of an email, a CC line, or a BCC line. Each email message may include content (such as text or images). The content may be important for the recipients to review. The content may be important because it asks the recipients to perform a task or provide information. The content may be important because it is significant to a recipient's job responsibilities. For example, the content may include instructions regarding an important client meeting to take place the next day in which the recipient is participating. Or the content may include important specification changes to a project on which the recipient is working. In other cases, the content may be less significant or trivial. For example, the content may be announcing that the office building windows will be cleaned next week.

Each email message that a user receives may be initially marked as unread (or have an unread status). Marking a message as unread may indicate that the recipient has not yet viewed the email message. Once a recipient views an email message, the message may be marked as read (or have a read status). A purpose of marking messages as unread may be to allow a user to easily recognize which of the user's emails the user has not yet reviewed.

A user may receive a large volume of email messages. The volume may be so large that the user is not able to timely review every email message the user receives. In other words, even though the user can easily see which of the user's messages are unread, the user may not have time to review all the messages marked as unread before the user receives additional messages. The problem of receiving more email messages than one can effectively manage is sometimes referred to as email overload. Email overload is frequently associated with work email but can apply to personal email as well. Email overload may result in recipients failing to timely review email messages containing important content, including content important to a user effectively performing the user's job responsibilities.

This disclosure describes systems and methods for allowing users to make better use of an email service by allowing the users to manage their email accounts and email messages more efficiently and effectively, especially when the users are experiencing email overload. An email ranking system addresses the problem of email overload by ranking emails based on the likelihood that the email contains content that is important to the recipient. The email ranking system may assign scores to emails. A score may represent a likelihood that an email contains content that is important to a user who is a recipient of the email. The email ranking system may determine the score based on the actions recipients of the email have taken with respect to the email. Certain recipient actions may cause the email ranking system to give an email a higher score. For example, the email ranking system may increase an email's score when recipients of the email open the email, reply to the email, forward the email, or flag the email. Giving an email a higher score may represent a determination that the email is more likely to contain content that is important to a user. Other recipient actions may cause the email ranking system to give the email a lower score. For example, the email ranking system may decrease the email's score when recipients of the email delete or archive the email. Giving an email a lower score may represent a determination that the email is less likely to contain content that is important to the user. Assigning scores to emails based on the actions of other recipients allows a user to easily prioritize review of emails that the other recipients considered to be worth reviewing or responding to.

In determining an email's score, the email ranking system may not give equal weight to the same actions of different recipients. The email ranking system may determine a weight to give an action of a recipient based on how closely connected the recipient is to a user. For example, the email ranking system may give actions of recipients who are closely connected to a user greater weight. Similarly, the email ranking system may also determine a weight to give an action of a recipient based on a type of connection that the recipient has with the user. For example, the email ranking system may give greater weight to an action of a user's manager than to an action of the user's coworker. The email ranking system may access a network graph to determine how closely connected a recipient is to a user and a type of connection between the recipient and the user. Assigning scores to emails based on how closely connected recipients are to a user and on a type of connection the user has with the recipients allows a user to easily prioritize review of emails that the user's close connections considered to be worth reviewing or responding to.

The email ranking system improves a user's ability to make use of the user's email account. The email ranking system may allow a client device to visually display emails messages to the user based on the scores of the email messages. The client device may typically display previews of the user's email messages in a list format in reverse chronological order based on when the user received the email messages. In other words, the client device may display previews of the most recently received email messages on the top of the list. But just because an email message is newer than a previous message does not necessarily mean the newer message is more important than the previous message. If a user receives a high volume of email, important email messages may be quickly buried by newer but less important email messages. The email ranking system may allow the client device to visually reorder all unread email messages in the user's inbox based on the scores assigned to the unread email messages. Alternatively, the email ranking system may allow the client device to visually reorder unread email messages received while the user was out of office or during a different defined time period. Email messages may be ordered from highest score to lowest score (where higher scores represent a higher probability that the email message is important). Presenting email messages in this way allows a user to easily prioritize review of email messages that are more likely to contain important content. Presenting email in this way helps solve the problems associated with managing email messages while a user is experiencing email overload.

Email overload creates real costs to users of an email service. Users may be required to spend excessive amounts of time reviewing trivial email messages to identify important email messages. As a result, users may fail to timely identify and review important messages and may fail to timely perform important tasks or provide urgently needed information. The email ranking system helps users of an email service save themselves and their employers time and money.

The email ranking system improves on other attempts to address email overload. One attempt to alleviate email overload involves using machine learning classifiers to automatically group messages into categories. This method may help users ignore certain types of emails, but it does not help users know which emails within any given category are most important.

FIG. 1 illustrates an example email system 100. The email system 100 may include an email service 102. Users 114a, 114b, 114c, 114d may access the email service 102 using client devices 116a, 116b, 116c, 116d. The email service 102 may have access to a network graph 112.

The email service 102 may be a collection of hardware and software designed to manage email messages. The email service 102 may manage email messages for multiple accounts, including email accounts 106a, 106b, 106c, 106d. Each account may be associated with one or more email addresses. Each email account that the email service 102 manages may be associated with a particular user. The particular user (which may be an organization, a group, or an individual) may access an email account to send, receive, review, and manage email messages. For example, the email account 106a may be associated with the user 114a. The email account 106b may be associated with the user 114b. The email account 106c may be associated with the user 114c. The email account 106d may be associated with the user 114d. Accessing email messages associated with an account may require use of authentication information, such as a password.

When an email message is sent to or from the one or more email addresses associated with an account, the email service 102 may store a copy of the email message and associate the email message with the account. The email service 102 may include one or more storage devices capable of storing copies of email messages. The email accounts 106a, 106b, 106c, 106d may include messages 108a, 108b, 108c, 108d. The messages 108a, 108b, 108c, 108d may be email messages sent from or received by the email accounts 106a, 106b, 106c, 106d. The messages 108a, 108b, 108c, 108d may be email messages sent by or directed to email addresses and users associated with the email accounts 106a, 106b, 106c, 106d. For example, the messages 108a may be email messages sent by or directed to user 114a. The messages 108b may be email messages sent by or directed to user 114b. The messages 108c may be email messages sent by or directed to user 114c. The messages 108d may be email messages sent by or directed to user 114d.

A user may use an application or a web interface (through an internet browser) to view and respond to email messages associated with an account. The internet browser or the application may reside on a client device (such as a smartphone, laptop, tablet, or desktop computer). For example, the user 114a may use the client device 116a to access the email account 106a and to view, read, respond to, and manage email messages directed to the user 114a. The user 114b may use the client device 116b to access the email account 106b to view, read, respond to, and manage email messages directed to the user 114b. The user 114c may use the client device 116c to access the email account 106c and to view, read, respond to, and manage email messages directed to the user 114c. The user 114d may use the client device 116d to access the email account 106d and to view, read, respond to, and manage email messages directed to the user 114d. The client devices 116a, 116b, 116c, 116d may access the email accounts 106a, 106b, 106c, 106d using one or more networks 132.

The client devices 116a, 116b, 116c, 116d may have display screens. The client devices 116a, 116b, 116c, 116d may display previews of the messages 108a, 108b, 108c, 108d. The previews may be displayed in a list format. The client devices 116a, 116b, 116c, 116d may display the previews in reverse chronological order based on when the messages 108a, 108b, 108c, 108d were received. In other words, messages received most recently may be at the tops of the lists.

The users 114a, 114b, 114c, 114d may all work for or be affiliated with a same organization or company. For example, the users 114a, 114b, 114c, 114d may all be employees of the same company. The email accounts 106a, 106b, 106c, 106d may be email accounts that the users 114a, 114b, 114c, 114d use to manage business email. The users 114a, 114b, 114c, 114d may receive a large amount of email messages. The users 114a, 114b, 114c, 114d may receive more email messages than they have time to review. As a result, the users 114a, 114b, 114c, 114d may experience email overload. Some of the email messages the users 114a, 114b, 114c, 114d receive may be more important to the users 114a, 114b, 114c, 114d than other email messages. The users 114a, 114b, 114c, 114d may fail to timely review important email messages because of email overload. Failing to timely review important email messages may negatively impact the organization or company with which the users 114a, 114b, 114c, 114d are affiliated.

The email ranking system 104 may assist users of the email service 102 in more quickly identifying email messages that are most important to the users. When users are experiencing email overload, the email ranking system 104 helps the users prioritize review of important email messages. To help users (such as the users 114a, 114b, 114c, 114d) more quickly identify important email messages (such as important email messages among the messages 108a, 108b, 108c, 108d) the email ranking system 104 may assign scores to email messages. A score assigned to a message received by a user may represent a measure of the likelihood that the message contains content that is important for the user to review. A score may be a probability that the message contains content that is important for the user to review. A score may be a numeric value. The email ranking system 104 may assign a score to each email message that a user has received or to a subset of received emails (such as unread received emails). The email ranking system 104 may assign scores 110a, 110b, 110c, 110d to the messages 108a, 108b, 108c, 108d.

The email ranking system 104 may determine a score based on actions recipients of a message take with respect to the message. The email ranking system 104 may determine a score based on the types of actions recipients of a message take with respect to the message. The email ranking system 104 may consider certain types of actions as indicating that a message is more likely to contain important content and consider other types of actions as indicating that a message is less likely to contain important content. The email ranking system 104 may consider a lack of action to be neutral in terms of indicating whether message is important or not.

When a recipient receives an email, the recipient may be able to take different actions with respect to the email. For example, the recipient may read the email, flag the email, reply to the email, forward the email, delete the email, or archive the email. The email ranking system 104 may consider the actions of reading the email, flagging the email, forwarding the email, and replying to the email as indicating that the email is likely to contain important content. The email ranking system 104 may view the actions of deleting the email and archiving the email as indicating that the email is unlikely to contain important content. For ease of reference, this disclosure may refer to actions that the email ranking system 104 considers as indicating that an email is more likely to contain important content as "positive actions." Similarly, this disclosure may refer to actions that the email ranking system 104 considers as indicating that an email is less likely to contain important content as "negative actions." The email ranking system 104 may consider a recipient taking no action with respect to an email message as a neutral action that does not impact a score. In other designs, the email ranking system 104 may consider a recipient taking no action after a defined period of time has past as a negative action.

Assume that in terms of scores that the email ranking system 104 assigns, higher scores represent a higher likelihood that an email message contains important content. In that case, positive actions may cause the email ranking system 104 to increase a score (or determine a higher score) while negative actions may cause the email ranking system 104 to decrease the score (or determine a lower score). For example, the email ranking system 104 may increase a score of a message if a recipient flags the message, reads the message, replies to the message, or forwards the message. Each type of positive action may have the same type of impact on a score. In the alternative, some types of positive actions may have a greater impact on a score. For example, the act of replying to a message may cause a greater increase to a score than the act of reading a message. The impact a type of positive action has on a score may be based on how strongly that type of positive action indicates that the message is important. And the email ranking system 104 may decrease a score of a message if a recipient deletes the message or archives the message. Each type of negative action may have the same type of impact on a score. In the alternative, some types of negative actions may have a greater impact on a score. For example, the act of deleting a message may cause a greater decrease to a score than the act of archiving a message. The impact a type of negative action has on a score may be based on how strongly that type of negative action indicates that the message is not important. The email ranking system 104 may leave a score of a message unchanged if a recipient takes no action with respect to the message.

In this way, actions of recipients of a message may act like votes for and against an email being important to a user. Recipients who take positive actions may be voting in favor of the email being important to the user. Recipients who take negative actions may be voting against the email being important. Recipients who do not take any action with respect to the email may be neutral votes or non-votes. Scoring emails in this way allows a user to easily prioritize review of emails that other recipients consider to be worth reviewing.

For example, assume that the user 114a, the user 114b, and the user 114c receive a first message. Assume that the user 114a, the user 114b, and the user 114c also receive a second message. Assume that the user 114b and the user 114c read the first message. Assume that none of the users 114a, 114b, 114c have read the second message. The email ranking system 104 may assign a first score to the first message and a second score to the second message. The first score may represent a measure of the likelihood that the first message is important to the user 114a. Similarly, the second score may represent a measure of the likelihood that the second message is important to the user 114a. The first score may be higher than the second score because two recipients took positive actions with respect to the first message while none of the recipients took any action with respect to the second message.

The email ranking system 104 may consider the relationships between a user and recipients of a message in determining a score of the message. The email ranking system 104 may consider how closely connected the user is to the recipients in determining the score of the message. For example, the email ranking system 104 may consider distances between a user and recipients of a message in determining a score of the message. A distance between a user and a recipient may be a measure of how closely connected a user is to a recipient or a measure of a closeness of connection between the user and the recipient. By way of example, in a workplace context, a first distance between a user and a first coworker with whom the user works directly may be less than a second distance between the user and a second coworker with whom the user does not work directly. Similarly, as another example in the workplace or social context, a first distance between a user and a first recipient with whom the user frequently communicates directly may be less than a second distance between the user and a second recipient with whom the user does not communicate directly or with whom the user communicates infrequently.

The email ranking system 104, in determining a score, may place greater weight on an action of a first recipient who is closer to a user than an action of a second recipient who is further to the user. In other words, the email ranking system 104, in determining a score, may place greater weight on actions of recipients who are more closely connected to a user than on actions of recipients who are less closely connected to the user. For example, assume a first recipient works directly with a user and a second recipient works directly with the first recipient but does not work directly with the user. The email ranking system 104 may place greater weight on actions of the first recipient than on actions of the second recipient in determining a score for a message directed to the user. Scoring emails in this way allows a user to easily prioritize review of emails that the user's close connections consider to be worth reviewing.

As part of considering the relationships between a user and recipients of a message in determining a score of the message, the email ranking system 104 may consider a type of relationship or connection the user has with the recipients in determining the score of the message. For example, relationships or connections may be hierarchical. A company may have a hierarchical organizational structure. Within a hierarchical structure, a user may have connections to superiors (e.g., managers), subordinates, and coworkers. As another example, a user may have a family relationship with some recipients, a personal relationship with some recipients, and a business relationship with other recipients. Those three types of relationships may all be different types of connections. As another example, a recipient may be a client or customer of a user. The email ranking system 104, in determining a score, may place greater weight on an action of a first recipient who has a first type of relationship with a user than an action of a second recipient who has a second type of relationship with the user. For example, assume a first recipient is a manager or supervisor of a user and a second recipient is a coworker of the user but does not supervise the user. The email ranking system 104 may place greater weight on actions of the first recipient than on actions of the second recipient in determining a score for a message directed to the user. Scoring emails in this way allows a user to easily prioritize review of emails that recipients with important connections to the user consider to be worth reviewing.

By considering relationships between a user and other recipients of a message in determining a score of the message, the email ranking system 104 may give greater weight to votes of recipients who are closely connected to the user or have a supervisory relationship with the user than to votes of recipients who are not closely connected to the user or have a less significant type of relationship with the user.

For example, assume that the user 114a, the user 114b, and the user 114c receive a third message. Assume that the user 114a, the user 114b, and the user 114d receive a fourth message. Assume that the user 114b and the user 114c have read the third message. Assume the user 114b and the user 114d have read the fourth message. Assume the user 114a works directly with the user 114b and the user 114c. Assume the user 114b works directly with the user 114d but that the user 114a does not work directly with the user 114d. The email ranking system 104 may assign a third score to the third message and a fourth score to the fourth message. The third score may represent a measure of the likelihood that the third message is important to the user 114a. The fourth score may represent a measure of the likelihood that the fourth message is important to the user 114a. The third score may be higher than the fourth score even though both the third message and the fourth message had two recipients take positive actions with respect to the messages. The third score may be higher because the other recipients of the third message (the user 114b and the user 114c) are direct coworkers of the user 114a while only one of the other recipients of the fourth message (the user 114b) is a direct coworker of the user 114a.

The email ranking system 104 may access the network graph 112 to acquire information regarding relationships between a user and recipients of a message. The network graph 112 may indicate connections between two or more persons. The network graph 112 may indicate a type of connection between two persons. The connections may be based on work relationships. The connections may be based on social relationships. The connections may be based on the messages 108a, 108b, 108c, 108d. For example, the connections may be based on how frequently a user exchanges emails with another user. The network graph 112 may be dynamically changed or updated based on the messages 108a, 108b, 108c, 108d. The network graph 112 may be based on a social network or workplace network. The network graph 112 may be part of the email service 102. In the alternative, the network graph 112 may be separate from the email service 102. The email service 102 may have access to the network graph 112.

The network graph 112 may indicate a distance between two persons. The distance between two persons may be a number that represents how closely connected a first person is to a second person. In other words, a distance may represent a measure of closeness of two persons or a closeness of connection of two persons. A first distance between a first pair of persons that is larger than a second distance between a second pair of persons may represent that the first pair of persons are less closely connected than the second pair of persons. For example, two persons who work directly together may be more closely connected than two persons who are on different teams. As another example, two persons who communicate regularly may be more closely connected than two persons who communicate only occasionally. As another example, two persons who are directly connected in a social media network may be more closely connected than two persons who are only indirectly connected in the social media network. The distance between a first person and a second person may be a measure of the number of connections required to reach the second person from the first person. For example, assume the network graph 112 indicates connections based on work relationships. Assume a first person works directly with a second person. Assume the second person works directly with a third person. Assume the first person does not work directly with the third person. A first distance between the first person and the second person may be one. A second distance between the first person and the third person may be two.

The email ranking system 104 may allow client devices to display email messages based on scores. Displaying email messages based on scores allows users to identify important email messages more easily and quickly. It may be common for a user to view email messages based on the times the user's email account received the email messages. For example, a client device (such as the client devices 116a, 116b, 116c, 116d) may display previews of messages on a display screen in the form of a list in reverse chronological order with more recently received emails appearing at a top of the list. But email messages that a user received most recently may not be the most important messages for the user to review. For users that receive a high volume of email messages, the most important messages may be buried by more recently received but less important messages.

Because of the email ranking system 104, instead of displaying previews of messages based on time of receipt, a client device can display the previews in descending order based on scores associated with the messages. Displaying the previews in this way puts the most important messages at the top of the list. Arranging messages in this way allows a user (such as the users 114a, 114b, 114c, 114d) to easily identify messages that are most likely to contain content that is important to the user and prioritize review of those messages. As a result, the user can make better use of the client device, the user's email account, and the email service. The user can more effectively perform the user's job responsibilities.

Figure 2A:
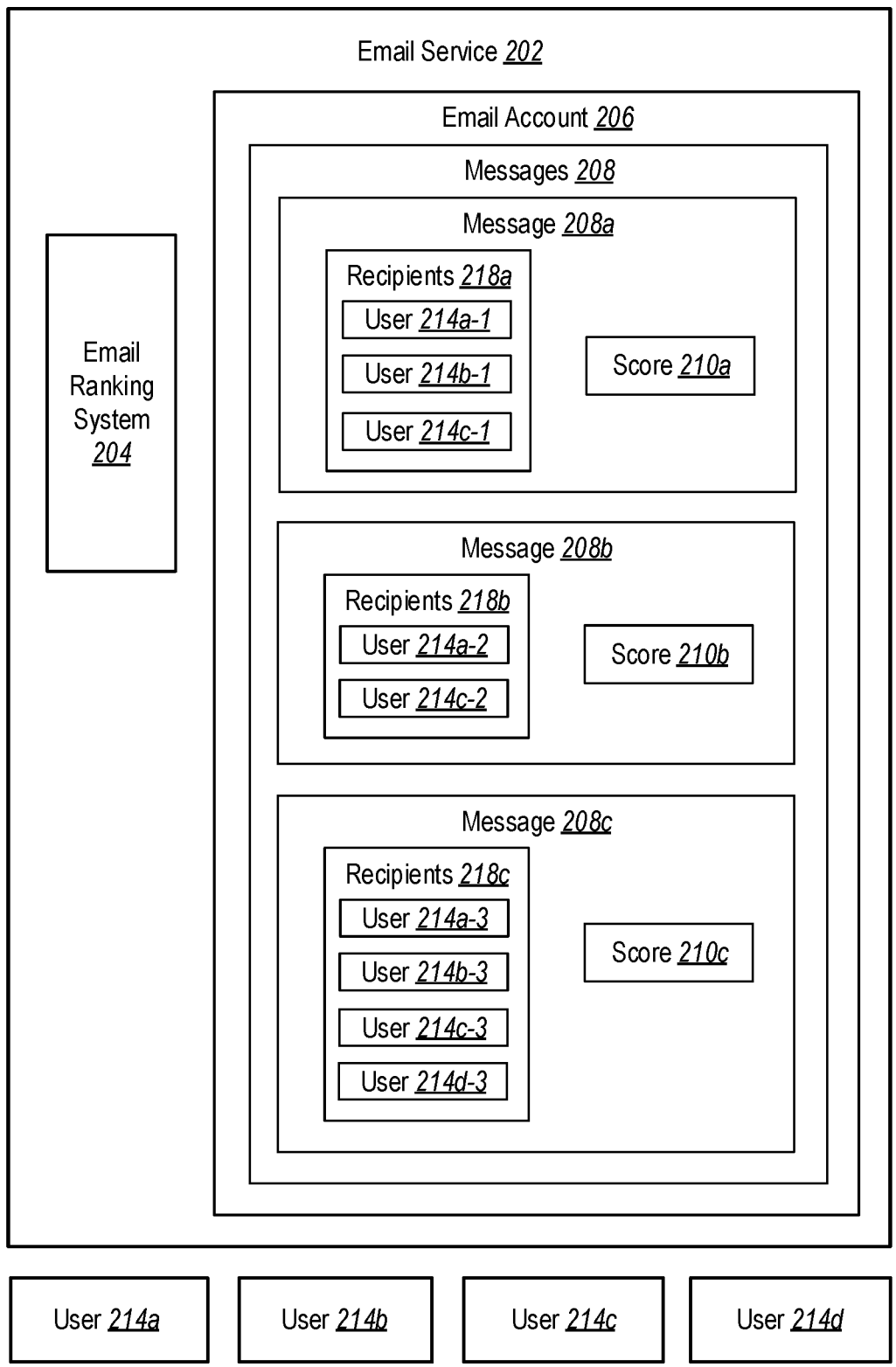
FIG. 2A illustrates an example email service that includes an email ranking system that assigns scores to messages associated with an email account.
Figure 2B:
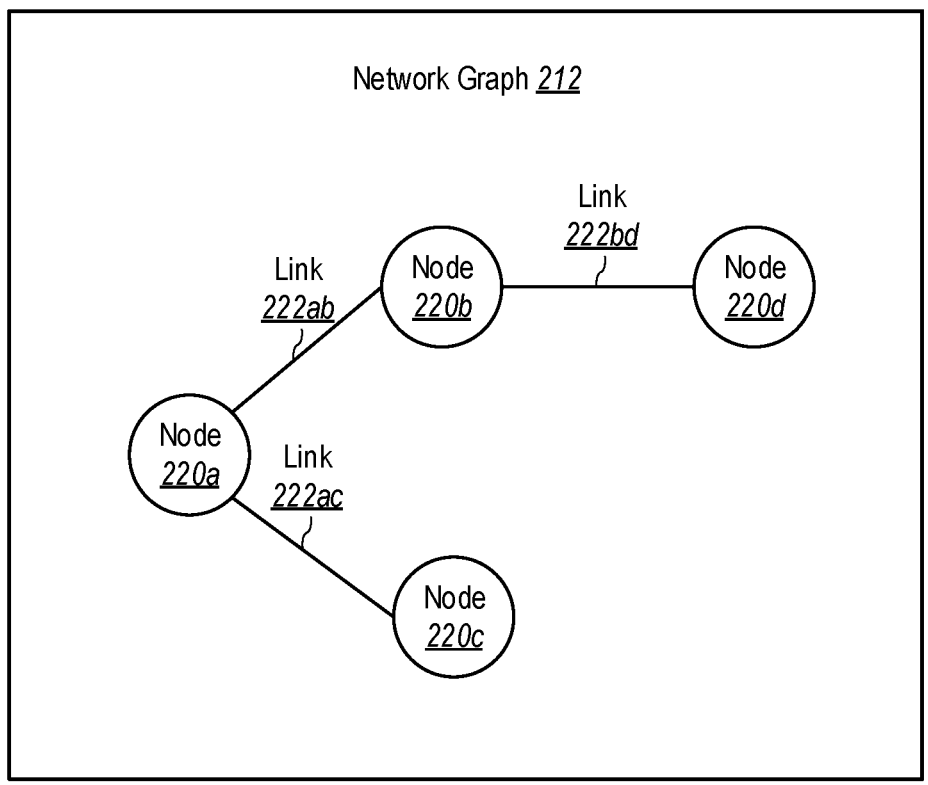
FIG. 2B illustrates an example network graph that may be used by an email ranking system to determine scores for email messages.

FIG. 2A illustrates an email service 202, and FIG. 2B illustrates a network graph 212. The email service 202 may include an email account 206 and an email ranking system 204.

The email account 206 may be associated with a user. The email account 206 may store email messages sent by the user and sent to the user. The email account 206 may have one or more associated email addresses. The email account 206 may store email messages sent from the one or more associated email addresses and email messages sent to the one or more associated email addresses. For example, the email account 206 may be associated with a user 214a and include messages 208. The messages 208 may include message 208a, message 208b, and message 208c. The messages 208a, 208b, 208c may have been sent to the user 214a. The user 214a may not have read the messages 208a, 208b, 208c.

An email message associated with the email account 206 may have one or more recipients. The one or more recipients may be users to whom (or email addresses to which) the email message was sent. The one or more recipients may have email accounts with the email service 202. In the alternative, the one or more recipients may have email accounts with a separate email service. The message 208a may have been sent to recipients 218a. The recipients 218a may be the user 214a, user 214b, and user 214c (as indicated in FIG. 2A by the boxes labeled user 214a-1, user 214b-2, and user 214c-3 appearing in the recipients 218a). The message 208b may have been sent to recipients 218b. The recipients 218b may be the user 214a and the user 214c (as indicated in FIG. 2A by the boxes labeled user 214a-2 and user 214c-2 appearing in the recipients 218b). The message 208c may have been sent to recipients 218c. The recipients 218c may be the user 214a, the user 214b, the user 214c, and the user 214d (as indicated in FIG. 2A by the boxes labeled user 214a-3, user 214b-3, user 214c-3, and user 214d-3).

Messages stored in the email account 206 may include scores. The email ranking system 204 may assign the scores to the messages stored in the email account 206. The score the email ranking system 204 assigns to each message stored in the email account 206 may represent a likelihood that the message contains content that is important to the user associated with the email account 206. The message 208a may include a score 210a, which may represent a likelihood that the message 208a is important to the user 214a. The message 208b may include a score 210b, which may represent a likelihood that the message 208b is important to the user 214b. The message 208c may include a score 210c, which may represent a likelihood that the message 208c is important to the user 214c.

The email ranking system 204 may automatically determine the scores (such as the scores 210a, 210b, 210c) without human intervention. The email ranking system 204 may dynamically determine and update the scores. For example, assume the email account 206 receives a message. The email ranking system 204 may determine a score for the message upon receipt of the message. The email ranking system 204 may update the score for the message whenever any recipient of the message takes an action with respect to the message.

In the alternative, the email ranking system 204 may determine the scores at a particular interval. For example, the email ranking system 204 may determine the scores each morning at 6:00 a.m. As another example, the email ranking system 204 may determine and update the scores every hour. The scores may reset after each interval.

The email ranking system 204 may determine scores for messages stored in the email account 206 based on actions of recipients of the messages. For example, the email ranking system 204 may determine the score 210a based on actions of the recipients 218a. The email ranking system 204 may determine the score 210b based on actions of the recipients 218b. The email ranking system 204 may determine the score 210c based on actions of the recipients 218c. The email ranking system 204 may determine the scores 210a, 210b, 210c based on actions of recipients other than the user 214a associated with the email account 206.

The email ranking system 204 may determine the scores for the messages stored in the email account 206 based on the network graph 212. The network graph 212 may indicate connections between and among persons. The network graph 212 may indicate connections between and among users of the email service 202. The network graph 212 may also indicate distances between connections. The distance may represent how closely connected two persons are. Larger (or longer) distances may indicate that two persons are less closely connected. The network graph 212 may indicate a type of connection between two persons.

The network graph 212 may include nodes and links. Each node in the network graph 212 may represent a user or a person. Each link in the network graph 212 may represent a connection between two users or persons. The network graph 212 may include a node for users of the email service 202. The network graph 212 may include nodes for persons who do not use the email service 202.

In some designs, each link in the network graph may have a same weight or represent a same distance. For example, each link may have a weight or distance of one. In other designs, links may be given more or less weight based on a type of connection represented by a link. For example, a first link between a user and a manager of the user may have greater weight (or smaller or shorter distance) than a second link between the user and a direct coworker.

A distance between a first node and a second node in the network graph may be based on a number of links along a shortest path between the first node and the second node. In some designs, a distance between a first node and a second node may be based on a sum of weights of all links along a shortest path from the first node to the second node. A distance between a first node and a second node may represent a closeness of connection between the first node and the second node.

By way of example, the network graph 212 may include node 220a, node 220b, node 220c, and node 220d. The node 220a may represent the user 214a. The node 220b may represent the user 214b. The node 220c may represent the user 214c. The node 220d may represent the user 214d. The network graph 212 may also include link 222ab, link 222bd, and link 222ac. The link 222ab may represent a direct connection between the node 220a (which represents the user 214a) and the node 220b (which represents the user 214b). The link 222ac may represent a direct connection between the node 220a (which represents the user 214a) and the node 220c (which represents the user 214c). The link 222bd may represent a direct connection between the node 220b (which represents the user 214b) and the node 220d (which represents the user 214d).

The email ranking system 204 provides a solution to email overload in connection with the email account 206. The solution involves ranking email messages contained in the email account 206 to help a user identify which of the messages 208 (which may be large in number) in the email account 206 are most important. Instead of trying to organize email messages based on a time of receipt or based on an analysis of content contained in the email messages, the email ranking system 204 allows the user to organize and rank emails based on how other recipients have interacted with the email messages. In some designs, the email ranking system 204 assigns a score to each message as part of ranking the email messages. The score may represent a probability that the message is important to a user. The email service 202 or an email application may allow a client device to display email messages in a particular order based on the scores.

The email ranking system 204 may use an algorithm that scores and ranks email messages based on what recipients have done with respect to the emails and based on how closely connected the recipients are to a user. One example algorithm for determining scores for messages received by a user (such as the user 214a) may be as follows.

The email ranking system 204 may first compute a vector that represents an importance to a user of each email message that is being ranked based on actions of recipients of the email message. In some designs, the vector may be calculated as follows:

$$\vec{Z} = \Sigma_{k=1}^{n} w_k * d_k$$

In the above formula, k is an index number for each recipient of an email message other than the user; n is the total number of recipients of the email message, not counting the user; $w_k$ is a value for the action taken by recipient k of the email; and $d_k$ is equal to one divided by a distance between the recipient k and a user.

With respect to $w_k$, each possible action that a recipient can take with respect to an email message may be given a default numerical value. For example, the following actions may have the following values. In this example, each positive action has a numerical value of 1, and each negative action has a numerical value of −1. But in other examples, some positive actions may have a larger numerical value than other positive actions (such as 1.5 or 2), and some negative actions may have a more negative value than other negative actions (such as −1.5 or −2).

| Action | Value |
|---|---|
| Delete | −1 |
| Archive | −1 |
| Leave Unread | 0 |
| Reply | 1 |
| Read | 1 |
| Forward | 1 |
| Flag | 1 |

In determining $w_k$, the email ranking system 204 may spread each recipient's vote evenly across all the emails with which the recipient has interacted in a particular time period. To simplify the calculation the email ranking system 204 may determine $w_k$ once for a 24-hour period and reset it daily. The actions of recipients who are listed on a CC line may be reduced in value (e.g., halved) as compared to the actions of recipients on a TO line.

In determining $d_k$, the distance may be equivalent to a number of links along a shortest path from the user to the recipient k. The value $d_k$ (which in this example is equal to one divided by the distance) provides a way for the email ranking system 204 to place greater significance on actions that closer coworkers take with respect to an email message.

Once the email ranking system 204 computes the vector Z, the email ranking system may transform the vector Z into a probability vector:

$$\partial(\vec{z})_i = \frac{e^{Z_i}}{\sum_{J}^{K} e^{Z_j}}$$

By way of example, the score 210a, the score 210b, and the score 210c may be calculated as follows using the above algorithm. For purposes of this example, assume that the user 214a is represented as the node 220a in the network graph 212. Assume the user 214a received the message 208a, the message 208b, and the message 208c. Assume the user 214b is represented as the node 220b in the network graph 212. Assume the user 214b received the message 208a and the message 208c. Assume the user 214c is represented by the node 220c in the network graph 212. Assume the user 214c received the message 208a, the message 208b, and the message 208c. Assume the user 214d is represented by the node 220d in the network graph 212. Assume the user 214d received the message 208c.

Assume that the message 208a was received by the user 214a one minute ago, the message 208b was received by the user 214a five minutes ago, and the message 208c was received by the user 214a 10 minutes ago. Assume that the user 214b and the user 214c have read the message 208a. Assume that neither the user 214a nor the user 214c have read the message 208b. Assume that the user 214b, the user 214c, and the user 214d have read the message 208c.

The email ranking system 204 may compute the individual Z values as follows:

Z1 (for the message 208a)=$(W_1*D_1+W_2*D_2)$=0.5*1+ 0.5*1=1

Z2 (for the message 208b)=$(W_2*D_2)$=(0*1)=0

Z3 (for the message 208c)=$(W_1*D_1+W_2*D_2+W_3*D_3)$ =(0.5*1+0.5*1+1*0.5)=1.5

The email ranking system 204 may generate the following vector based on the above Z values:

$$\vec{Z} = \begin{bmatrix} 1 \\ 0 \\ 1.5 \end{bmatrix}$$

The email ranking system 204 may transform the values of vector Z into probabilities as follows:

$e^{Z1}=e^1=2.71$ $e^{Z2}=e^0=1$ $e^{Z3}=e^{1.5}=4.48$ $\Sigma_J^K e^{Zj}=e^{z1}+e^{z2}+e^{z3}=2.71+1+4.48=8.19$ The email ranking system 204 may then compute each probability value as follows:

$$\partial(\vec{z})_1 = \frac{2.71}{8.19} = 0.33$$

$$\partial(\vec{z})_2 = \frac{1}{8.19} = 0.12$$

$$\partial(\vec{z})_3 = \frac{4.48}{8.19} = 0.54$$

The final probability vector calculated by the email ranking system 204 for this example may be as follows:

$$\partial(\vec{z})_i = \begin{bmatrix} 0.33 \\ 0.12 \\ 0.54 \end{bmatrix}$$

This resulting probability vector may indicate that the message 208c has the highest probability of being important (0.54) to the user 214a based on the fact that every recipient other than the user 214a has voted positively by reading the message 208c. The message 208b has the lowest probability of being important (0.21). The message 208c has the second highest probability of being important (0.33). The email ranking system 204 may determine that the score 210a of the message 208a is 0.33. The email ranking system 204 may determine that the score 210b of the message 208b is 0.12.

The email ranking system 204 may determine that the score 210c of the message 208c is 0.54.

A client device displaying previews of the messages 208a, 208b, 208c may display the previews based on the scores 210a, 210b, 210c. The client device may display the previews in a list format based on the scores 210a, 210b, 210c. The client device may display the message 208c at a top of the list. The client device may display the message 208a second in the list. The client device may display the message 208b third in the list. This order may be different from how the client device would display the previews based on when the email account 206 received the messages 208a, 208b, 208c.

Figure 3A:
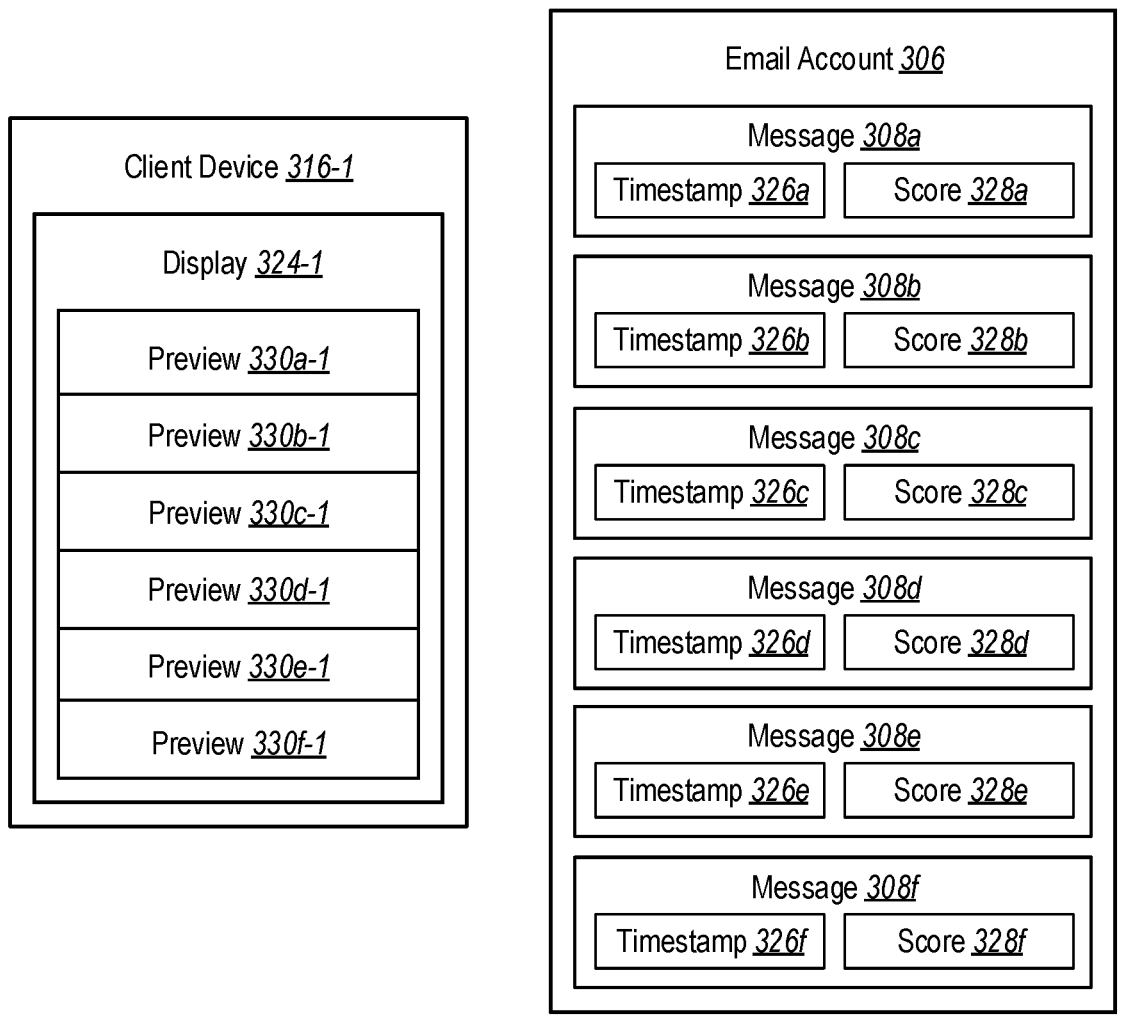
FIG. 3A illustrates an example client device that displays previews of email messages based on timestamps associated with the email messages.

FIG. 3A illustrates a client device 316-1. The client device 316-1 may include an email application. The email application may be a program for managing email messages. The email application may communicate with an email service through a network. The email application may receive copies of email messages from the email service. The email application may allow a user to view downloaded email messages and compose and send email messages through the email service. The email application may provide updates to the email service regarding the email messages.

The client device 316-1 may include a browser. The browser may allow the client device 316-1 to access the email service through a network. The browser may allow a user to view and interact with email messages.

The client device 316-1 may include a display 324-1. The display 324-1 may be visible to a user of the client device 316-1. The user may use the client device 316-1 to view and interact with email messages. The client device 316-1 may display email messages to the user on the display 324-1. The client device 316-1 may display previews of the email messages on the display 324-1.

An email account 306 may include messages 308a, 308b, 308c, 308d, 308e, 308f. Each of the messages 308a, 308b, 308c, 308d, 308e, 308f may include a timestamp and a score. The timestamps may indicate a date and a time each email message was received by the email account. The score may represent a likelihood that the email contains content important to a user associated with the email account. The message 308a may include timestamp 326a and score 328a. The message 308b may include timestamp 326b and score 328b. The message 308c may include timestamp 326c and score 328c. The message 308d may include timestamp 326d and score 328d. The message 308e may include timestamp 326e and score 328e. The message 308f may include timestamp 326f and score 328f. The timestamp 326a may be more recent than the timestamp 326b. The timestamp 326b may be more recent than the timestamp 326c. The timestamp 326c may be more recent than the timestamp 326d. The timestamp 326d may be more recent than the timestamp 326e. The timestamp 326e may be more recent than the timestamp 326f.

The client device 316-1 may display previews 330a-1, 330b-1, 330c-1, 330d-1, 330e-1, 330f-1 of the messages 308a, 308b, 308c, 308d, 308e, 308f on the display 324-1. The preview 330a-1 may be a preview of the message 308a. The preview 330b-1 may be a preview of the message 308b. The preview 330c-1 may be a preview of the message 308c. The preview 330d-1 may be a preview of the message 308d. The preview 330e-1 may be a preview of the message 308e. The preview 330f-1 may be a preview of the message 308f. The previews 330a-1, 330b-1, 330c-1, 330d-1, 330e-1, 330f-1 may display information regarding the messages 308a, 308b, 308c, 308d, 308e, 308f. For example, the previews 330a-1, 330b-1, 330c-1, 330d-1, 330e-1, 330f-1 may include a sender of the message, a title of the message, and a small portion of the content of the message.

The client device 316-1 may display the previews 330a-1, 330b-1, 330c-1, 330d-1, 330e-1, 330f-1 of the messages 308a, 308b, 308c, 308d, 308e, 308f on the display 324-1 stacked on top of each other in a vertical list format. The client device 316-1 may display the previews 330a-1, 330b-1, 330c-1, 330d-1, 330e-1, 330f-1 on the display 324-1 in a particular order. For example, the client device 316-1 may display the previews 330a-1, 330b-1, 330c-1, 330d-1, 330e-1, 330f-1 in reverse chronological order based on the timestamps 326a, 326b, 326c, 326d, 326e, 326f. At the top of the vertical list, the client device 316-1 may display a message with a most recent timestamp. In this case, the timestamp 326a is the most recent timestamp. As a result, the client device 316-1 displays the preview 330a-1 at the top of the vertical list on the display 324-1.

Displaying the previews 330a-1, 330b-1, 330c-1, 330d-1, 330e-1, 330f-1 based on the timestamps 326a, 326b, 326c, 326d, 326e, 326f may be different from how the client device 316-1 would display the previews 330a-1, 330b-1, 330c-1, 330d-1, 330e-1, 330f-1 if the client device 316-1 were to display the previews 330a-1, 330b-1, 330c-1, 330d-1, 330e-1, 330f-1 based on the scores 328a, 328b, 328c, 328d, 328e, 328f. For example, the score 328e may be greater than the score 328c. The score 328c may be greater than the score 328f. The score 328f may be greater than the score 328a. The score 328a may be greater than the score 328d. The score 328d may be greater than the score 328b.

Figure 3B:
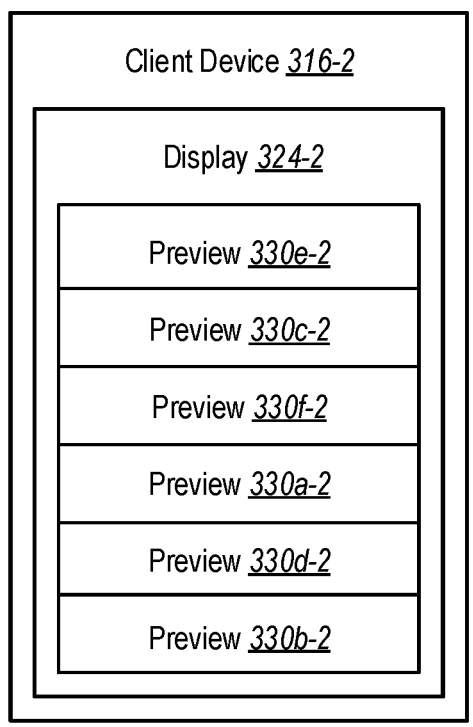
FIG. 3B illustrates the example client device displaying the previews of the email messages based on scores associated with the email messages.

FIG. 3B illustrates a client device 316-2. The client device 316-2 may be identical to the client device 316-1 except that the client device 316-2 is displaying previews of messages based on scores of the messages rather than timestamps of the messages. The client device 316-2 may include a display 324-2, which may be identical to the display 324-1.

The client device 316-2 may display previews 330a-2, 330b-2, 330c-2, 330d-2, 330e-2, 330f-2 of the messages 308a, 308b, 308c, 308d, 308e, 308f on the display 324-2. The previews 330a-2, 330b-2, 330c-2, 330d-2, 330e-2, 330f-2 may be identical to the previews 330a-1, 330b-1, 330c-1, 330d-1, 330e-1, 330f-1. Unlike the client device 316-1, the client device 316-2 may display the previews 330a-2, 330b-2, 330c-2, 330d-2, 330e-2, 330f-2 in descending order based on the scores 328a, 328b, 328c, 328d, 328e, 328f. At the top of the vertical list, the client device 316-2 may display a preview with a highest score. In this case, the score 328e is the highest score. As a result, the client device 316-2 displays the preview 308e-2 at the top of the vertical list on the display 324-2.

By displaying the previews 330a-2, 330b-2, 330c-2, 330d-2, 330e-2, 330f-2 based on the scores 328a, 328b, 328c, 328d, 328e, 328f, the client device 316-2 improves the functionality of the client device 316-2 and the email account 306. A user may use the client device 316-2 to access the email account 306. The user may access the email account 306 to exchange important information with coworkers and to receive instructions regarding the user's employment responsibilities. The user may also, however, receive many email messages that are not important to the user. Due to the volume of email messages that the user receives, the user may have a difficult time identifying important email messages. For example, the client device 316-1 displays the preview 330e-1 below the previews 330a-1, 330b-1, 330c-1, 330d-1 even though the message 330e has a higher likelihood of being important to the user than the messages 330a, 330b, 330c, 330d. The client device 316-2 uses the scores 328a, 328b, 328c, 328d, 328e, 328f to display the previews 330*a*-2, 330*b*-2, 330*c*-2, 330*d*-2, 330*e*-2, 330*f*-2 in descending order of importance. As a result, the user can easily prioritize review of email messages most likely to be important to the user. That saves the user time and reduces the likelihood that the user will miss important emails. Thus, the client device 316-2 helps the user be more efficient and effective at performing the user's employment responsibilities. In this way, an email ranking system improves the usefulness of the client device 316-2.

Figure 4:
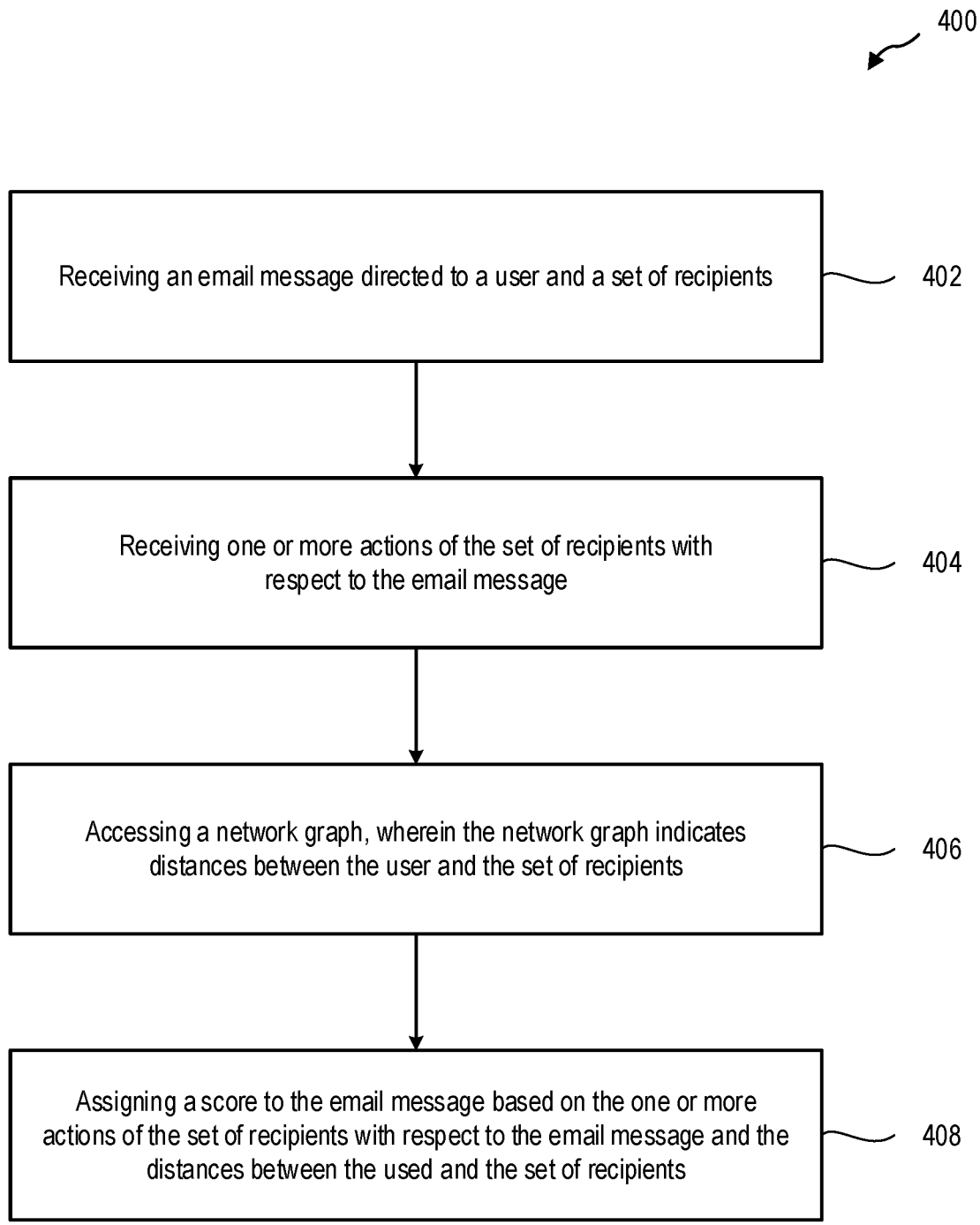
FIG. 4 illustrates an example method for ranking email messages.

FIG. 4 illustrates an example method 400.

The method 400 may include receiving 402 an email message directed to a user and a set of recipients. An email service may receive the email message.

The method 400 may include receiving 404 one or more actions of the set of recipients with respect to the email message. The email service may receive the one or more actions. The one or more actions may include reading the email message, replying to the email message, forwarding the email message, flagging the email message, deleting the email message, and archiving the email message.

The method 400 may include accessing 406 a network graph. The network graph may indicate distances between the user and each recipient in the set of recipients. The distances may represent a measure of closeness of connection between the user and each recipient in the set of recipients. The distances may represent how closely connected the user and each recipient in the set of recipients is. For example, a user may be more closely connected to a direct coworker in the same team than to another employee in a different team who does not work directly with the user. The distances may represent a measure of the number of connections required to reach a recipient in the set of recipients from the user.

The method 400 may include assigning 408 a score to the email message based on the one or more actions of the set of recipients with respect to the email message and the distances between the user and each recipient in the set of recipients. Assigning the score may include weighting the one or more actions of the set of recipients with respect to the email message based on the distances between the user and the set of recipients.

Figure 5:
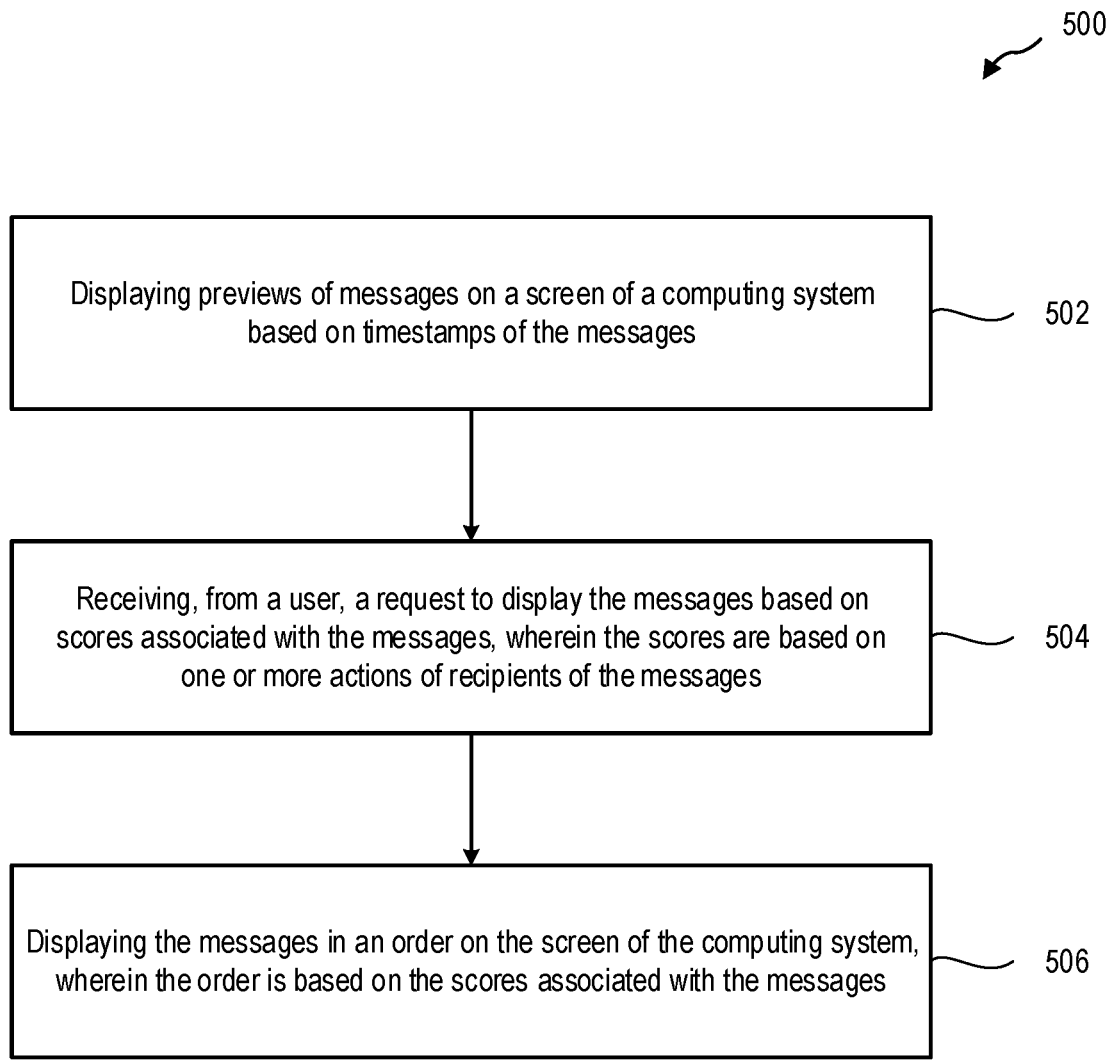
FIG. 5 illustrates an example method for displaying email messages based on scores associated with the email messages.

FIG. 5 illustrates an example method 500.

The method 500 may include displaying 502 previews of messages on a screen of a computing system based on timestamps of the messages. The timestamps may indicate a time at which an email account received the messages.

The method 500 may include receiving 504, from a user, a request to display the messages based on scores associated with the messages. The scores may be based on one or more actions of recipients of the messages. The scores may be based on distances between the user and the recipients of the messages. An email ranking system may have determined the scores.

The method 500 may include displaying 506 the messages on the screen of the computing system based on the scores associated with the messages.

Figure 6:
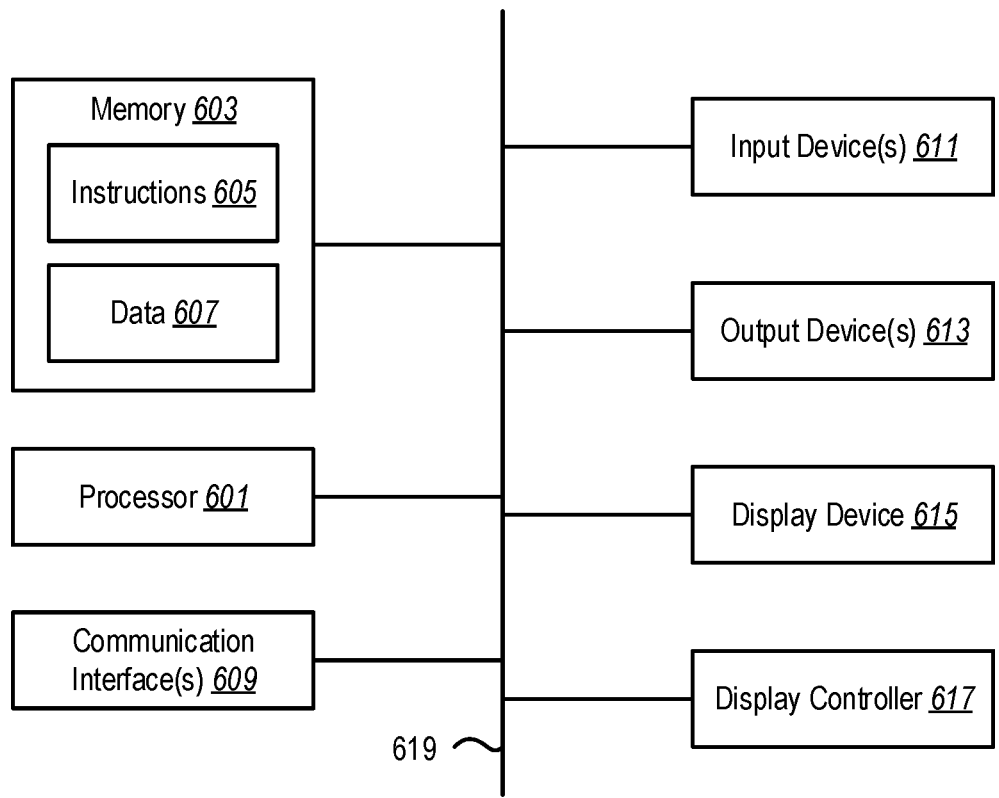
FIG. 6 illustrates components that may be included in a computer system.

FIG. 6 illustrates certain components that may be included within a computer system 600. One or more computer systems (such as the computer system 600) may be used to implement the various devices, components, and systems described herein. For example, the client devices 116*a*, 116*b*, 116*c*, 116*d* may be implemented using the computer system 600.

The computer system 600 includes a processor 601. The processor 601 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 601 may be referred to as a central processing unit (CPU). Although the computer system 600 includes just a single processor, in an alternative configuration, a combination of processors (e.g., an ARM and DSP) could be used.

The computer system 600 also includes memory 603 in electronic communication with the processor 601. The memory 603 may be any electronic component capable of storing electronic information. For example, the memory 603 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 605 and data 607 may be stored in the memory 603. The instructions 605 may be executable by the processor 601 to implement some or all of the functionality disclosed herein. Executing the instructions 605 may involve the use of the data 607 that is stored in the memory 603. Any of the various examples of modules, components, packages, applications, and operating systems described herein may be implemented, partially or wholly, as instructions 605 stored in memory 603 and executed by the processor 601. Any of the various examples of data described herein may be among the data 607 that is stored in memory 603 and used during execution of the instructions 605 by the processor 601.

A computer system 600 may also include one or more communication interfaces 609 for communicating with other electronic devices. The one or more communication interfaces 609 may be based on wired communication technology, wireless communication technology, or both. Some examples of the one or more communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 600 may also include one or more input devices 611 and one or more output devices 613. Some examples of the one or more input devices 611 include a keyboard, mouse, microphone, remote control device, button, joystick, trackball, touchpad, and lightpen. Some examples of the one or more output devices 613 include a speaker and a printer. One specific type of output device that is typically included in a computer system 600 is a display device 615. Display devices 615 used with embodiments disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into text, graphics, and/or moving images (as appropriate) shown on the display device 615.

The various components of the computer system 600 may be coupled together by one or more buses, which may include a power bus, a control signal bus, a status signal bus, a data bus, etc. For the sake of clarity, the various buses are illustrated in FIG. 6 as a bus system 619.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The techniques disclosed herein can be implemented in hardware, software, firmware, or any combination thereof, unless specifically described as being implemented in a specific manner. Any features described as modules, components, or the like can also be implemented together in an integrated logic device or separately as discrete but interoperable logic devices. If implemented in software, the techniques can be realized at least in part by a non-transitory computer-readable medium having computer-executable instructions stored thereon that, when executed by at least one processor, perform some or all of the steps, operations, actions, or other functionality disclosed herein. The instructions can be organized into routines, programs, objects, components, data structures, etc., which can perform particular tasks and/or implement particular data types, and which can be combined or distributed as desired in various embodiments.

The term "processor" can refer to a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, or the like. A processor can be a central processing unit (CPU). In some embodiments, a combination of processors (e.g., an ARM and DSP) could be used to implement some or all of the techniques disclosed herein.

The term "memory" can refer to any electronic component capable of storing electronic information. For example, memory may be embodied as random access memory (RAM), read-only memory (ROM), magnetic disk storage media, optical storage media, flash memory devices in RAM, on-board memory included with a processor, erasable programmable read-only memory (EPROM), electrically erasable programmable read-only memory (EEPROM) memory, registers, and so forth, including combinations thereof.

As an example, the term "circuitry" can refer to one or more integrated circuits, where an integrated circuit can include a set of electronic circuits on a piece of semiconductor material (e.g., silicon). In some embodiments, circuitry can include programmable logic devices such as field programmable gate arrays (FPGAs) and/or complex programmable logic devices (CPLDs). In some embodiments, circuitry can include application specific integrated circuits (ASICs). As another example, the term "circuitry" can refer to one or more discrete electronic circuits that include individual electronic components. As another example, the term "circuitry" can refer to a digital circuit, an analog circuit, or a mixed-signal circuit. "Circuitry" can also include combinations of the foregoing.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method comprising:
causing display of messages on a screen of a computing system based on timestamps of the messages, wherein the timestamps indicate times at which a messaging account received the messages;
receiving, from a user, a request to cause display of the messages based on scores associated with the messages, wherein the scores are based on one or more actions of recipients of the messages with respect to the messages and on distances between the user and the recipients as indicated by a network graph; and
causing display of a list of previews of the messages on the screen of the computing system, wherein an order of the previews within the list is based on the scores associated with the messages.

2. The method of claim 1, wherein causing the display of the list of the previews of the messages on the screen of the computing system comprises causing the display of the previews in descending order in the list based on the scores associated with the messages.

3. The method of claim 1, wherein the network graph comprises nodes representing the user and the recipients and links representing connections between the user and the recipients.

4. The method of claim 1, wherein the distances represent a measure of closeness of connection between the user and each recipient of the recipients.

5. The method of claim 1, wherein the scores are further based on weighting factors placed on the one or more actions and the weighting factors are based on the distances.

6. The method of claim 1, wherein the network graph indicates types of connections between the user and one or more recipients of the recipients.

7. The method of claim 6, wherein the scores are further based on the types of connection between the user and the recipients of the messages.

8. A computer-readable medium comprising instructions that are executable by one or more processors to cause a computing system to:
cause display of messages on a screen of the computing system based on timestamps of the messages, wherein the timestamps indicate times at which a messaging account received the messages;
receive, from a user, a request to cause display of the messages based on scores associated with the messages, wherein the scores are based on one or more actions of recipients of the messages with respect to the messages and on distances between the user and the recipients as indicated by a network graph; and
cause display of a list of previews of the messages on the screen of the computing system, wherein an order of the previews within the list is based on the scores associated with the messages.

9. The computer-readable medium of claim 8, wherein causing the display of the list of the previews of the messages on the screen of the computing system comprises causing the display of the previews in descending order in the list based on the scores associated with the messages.

10. The computer-readable medium of claim 8, wherein the network graph comprises nodes representing the user and the recipients and links representing connections between the user and the recipients.

11. The computer-readable medium of claim 8, wherein the scores are further based on weighting factors placed on the one or more actions and wherein the weighting factors are based on the distances.

12. The computer-readable medium of claim 11, wherein the messages comprise a first message and the recipients comprise a first recipient, wherein a first score is associated with the first message and the one or more actions comprises a first action by the first recipient with respect to the first message, wherein the network graph indicates a first distance between the user and the first recipient, wherein the first score is based on a first weighting factor placed on the first action, and wherein the first weighting factor is based on the first distance.

13. The computer-readable medium of claim 12, wherein the recipients comprise a second recipient, wherein the one or more actions comprises a second action by the second recipient with respect to the first message, wherein the network graph indicates a second distance between the user and the second recipient, wherein the second distance is larger than the first distance, wherein the first score is based on a second weighting factor placed on the second action, wherein the second weighting factor is based on the second distance, and wherein the second action receives less weight than the first action.

14. The computer-readable medium of claim 8, wherein the network graph indicates a type of hierarchical connection between the user and the recipients of the messages and the scores are further based on the type of hierarchical connection between the user and the recipients of the messages.

15. The computer-readable medium of claim 14, wherein the messages comprise a first message and the recipients comprise a first recipient, wherein a first score is associated with the first message and the one or more actions comprises a first action by the first recipient with respect to the first message, wherein the network graph indicates a first type of hierarchical connection between the user and the first recipient, wherein the first score is based on a first weighting factor placed on the first action, and wherein the first weighting factor is based on the first type of hierarchical connection.

16. The computer-readable medium of claim 15, wherein the recipients comprise a second recipient, wherein the one or more actions comprises a second action by the second recipient with respect to the first message, wherein the network graph indicates a second type of hierarchical connection between the user and the second recipient, wherein the second type of hierarchical connection is different from than the first type of hierarchical connection, wherein the first score is based on a second weighting factor placed on the second action, wherein the second weighting factor is based on the second type of hierarchical connection, and wherein the second action receives less weight than the first action.

17. A system comprising:
one or more processors;
memory in electronic communication with the one or more processors; and
instructions stored in the memory, the instructions being executable by the one or more processors to:
cause display of messages on a screen of the system based on timestamps of the messages, wherein the timestamps indicate times at which a messaging account received the messages;
receive, from a user, a request to cause display of the messages based on scores associated with the messages, wherein the scores are based on one or more actions of recipients of the messages with respect to the messages and on distances between the user and the recipients as indicated by a network graph; and
cause display of a list of previews of the messages on the screen of the system, wherein an order of the previews within the list is based on the scores associated with the messages.

18. The system of claim 17, wherein causing the display of the list of the previews of the messages on the screen of the system comprises causing the display of the previews in descending order in the list based on the scores associated with the messages.

19. The system of claim 17, wherein the scores are further based on weighting factors placed on the one or more actions and wherein the weighting factors are based on the distances.

20. The system of claim 17, wherein the network graph comprises nodes representing the user and the recipients and links representing connections between the user and the recipients.

* * * * *